United States Patent [19]

Steiner

[11] Patent Number: 4,532,716
[45] Date of Patent: Aug. 6, 1985

[54] TOOL PRESETTING DEVICE WITH TAPERED AIR SPINDLE MOUNT

[75] Inventor: Rudolph Steiner, Fairport, N.Y.
[73] Assignee: Parlec, Inc., Fairport, N.Y.
[21] Appl. No.: 546,819
[22] Filed: Oct. 31, 1983
[51] Int. Cl.$^3$ ................................................ G01B 5/02
[52] U.S. Cl. ................................... 33/201; 33/185 R; 33/DIG. 2; 269/20
[58] Field of Search ............ 33/169 R, 174 Q, 185 R, 33/201, DIG. 2; 269/16, 20; 384/110

[56] References Cited

U.S. PATENT DOCUMENTS

| | | | |
|---|---|---|---|
| 3,546,781 | 12/1970 | Cox et al. | 33/201 |
| 3,597,093 | 8/1971 | Wolf | 33/201 |
| 3,701,199 | 10/1972 | Lewis | 33/201 |
| 3,826,011 | 7/1974 | D'Aniello | 33/174 Q |
| 3,920,971 | 11/1975 | Bevis et al. | 33/201 |
| 4,031,628 | 6/1977 | Kaesemeyer | 33/201 |
| 4,228,595 | 10/1980 | Steinbach | 33/201 |
| 4,251,922 | 2/1981 | Perlotto | 33/169 R |

*Primary Examiner*—Richard R. Stearns
*Attorney, Agent, or Firm*—Shlesinger, Fitzsimmons & Shlesinger

[57] ABSTRACT

A tool holder has on its lower end an inverted, frusto-conically shaped bearing surface which is releasably seated coaxially in a correspondingly shaped opening which is formed in the upper surface of a stationary support. Intermediate its ends the bore wall which defines the frusto-conically shaped opening in the support has therein a shallow, circumferential recess, which is connected through a port in the support with a supply of fluid under pressure. In use the lower end of the tool holder is held in the opening in the support solely by gravity; and a tool, which is mounted in the upper end of the holder, is positioned adjacent a conventional gauging device which can measure tooth height and tool runout. Fluid under pressure is supplied to the recess in an amount sufficient to cause the tool holder to be elevated slightly without breaking the seal between the recess and the frusto-conically shaped bearing surface on the tool holder, whereby the tool holder can then be readily rotated manually. In a second embodiment two such supports are mounted in coaxially spaced, confronting relation, rotatably to support a specially shaped spindle, which has thereon a pair of opposed, axially spaced, frusto-conically shaped bearing surfaces that are rotatably seated in said supports coaxially thereof. Each support has the circumferential recess in its bore connected to a supply of fluid under pressure, so that when fluid is supplied to the recesses the associated supports tend to shift slightly axially away from each other to reduce the resistance to rotation of the shaft relative to the supports.

6 Claims, 3 Drawing Figures

TOOL PRESETTING DEVICE WITH TAPERED AIR SPINDLE MOUNT

BACKGROUND OF THE INVENTION

This invention relates to a tool presetting device or gauging instrument that is employed for checking the accuracy or precision of cutting tools, such as drills, taps, face milling cutters, and the like. Even more particularly, this invention relates to a novel air spindle mount that is adapted to be used in presetting devices or instruments of the type described substantially to increase the accuracy of the instrument.

Particularly in the case of precision tooling, it is customary to check the accuracy of a tool with a presetting device or instrument, which measures or gauges the tool to detect any undesirable runout or cutting edge inaccuracies. In practice the tool is mounted in a conventional tool holder, which in turn is mounted upright on a horizontal support for rotation about a vertical axis adjacent a conventional height and runout gauge. The underside of the associated gauge feeler is then carefully positioned in engagement with the upper end of the tool, and the holder is then rotated so that any cutting edges on the upper end of the tool which extend beyond the proper tool height will be detected by the associated gauge. The feeler also has thereon a projection for engagement with one diametral side of the rotating tool so that the feeler can also detect any undesirable runout of the tool relative to its vertical axis of rotation.

A major disadvantage of prior such instruments has been the practice of using a separate spindle for releasably and rotatably mounting the tool holder on the stationary support. Normally such spindles are mounted in the support for rotation about a vertical axis by virtue of conventional ball bearings, roller bearings, or even pneumatic or hydraulic bearings. The fact remains, however, that despite the manner in which it is mounted on the support, the use of a separate rotary spindle for supporting the tool holder in an instrument of the type described has tended to introduce not only the inaccuracies or errors which exist in the tool itself, or its holder, but also any inaccuracies which may exist in the supporting spindle, thereby reducing the overall accuracy of the presetting device.

A primary object of this invention, therefore, is to eliminate from tool presetting instruments of the type described, the rotary spindles heretofore employed for supporting the tool holder and associated cutting tool during the measurement or gauging of the tool accuracy.

Another object of this invention is to provide a presetting device of the type described which utilizes a novel, tapered air spindle mount for rotatably supporting a tool holder and its associated cutting tool in an upright position.

Still a further object of this invention is to provide a novel, tapered air spindle mount for use in rotatably supporting one end of a shaft for substantially friction free rotation about a predetermined axis.

Other objects of the invention will be apparent hereinafter from the specification and from the recital of the appended claims, particularly when read in conjunction with the accompanying drawings.

SUMMARY OF THE INVENTION

A cylindrical spindle support, which is secured in an opening formed in the horizontal upper surface of a stationary frame or base plate, has therethrough an inverted, frusto-conically shaped bore, the axis of which extends vertically and coaxially of the support. Intermediate its ends the frusto-conical bore wall has therein a shallow, circumferential recess or chamber which communicates through a port in the wall of the support with a compressed air supply.

Removably seated in the frusto-conical bore of the spindle support coaxially thereof is the frusto-conically shaped lower end of a conventional tool holder, the upper end of which has secured therein the particular cutting tool which is to be gauged or inspected. The tapered or frusto-conically shaped lower end of the tool holder is complimentary to, and seats snugly in, the tapered bore in the spindle support, and extends downwardly beneath the lower edge of the circumferential recess that is formed in the bore of the spindle support. The circumferential recess in the support is thus completely sealed by the confronting, frusto-conically shaped surface of the tool holder, thereby forming a sealed chamber around the lower end of the tool holder.

In use, the feeler of a conventional height and radius gauge is placed in an operative position relative to the upper end of whatever tool happens to be mounted in the tool holder. Compressed air from a supply thereof is then fed through an ON-OFF valve, a pressure regulator, and the port in the spindle support to the now-sealed chamber in the bore wall of the support. The air pressure in the chamber is adjusted to the point where it tends to elevate the tool holder slightly relative to the spindle support, but without actually permitting compressed air to leak from the circumferential recess into the bore of the support. It is then a relatively simple matter for an operator manually to rotate the tool holder as it rests within and is accurately supported by, the bore of the spindle support.

After the inspection has been completed the manually operable valve can be turned to shut off the air supply to the recess in the spindle support; and the tool holder can be removed from the support simply by lifting it out of the frusto-conical bore in the support.

A pair of tapered air spindle supports of the type described can also be utilized for journaling a shaft for rotation about a stationary axis. For this purposed a pair of axially spaced, oppositely facing, frusto-conically shaped bearing surfaces are formed coaxially on the shaft, and in turn are seated coaxially in the frusto-conically shaped bores of a pair of confronting, axially spaced spindle supports. Each spindle support has in its bore wall a circumferential recess of the type noted above, and each such recess is connected with a supply of fluid under pressure, which is selectively supplied to the recesses. The two supports are mounted for limited axial movement relative to one another, so that when fluid under pressure is applied to the recesses in their bores the supports tend to shift axially slightly away from one another, in turn allowing the fluid under pressure to support the two tapered or frusto-conical surfaces of the shaft for rotation relative to the supports.

THE DRAWINGS

Figure 1:
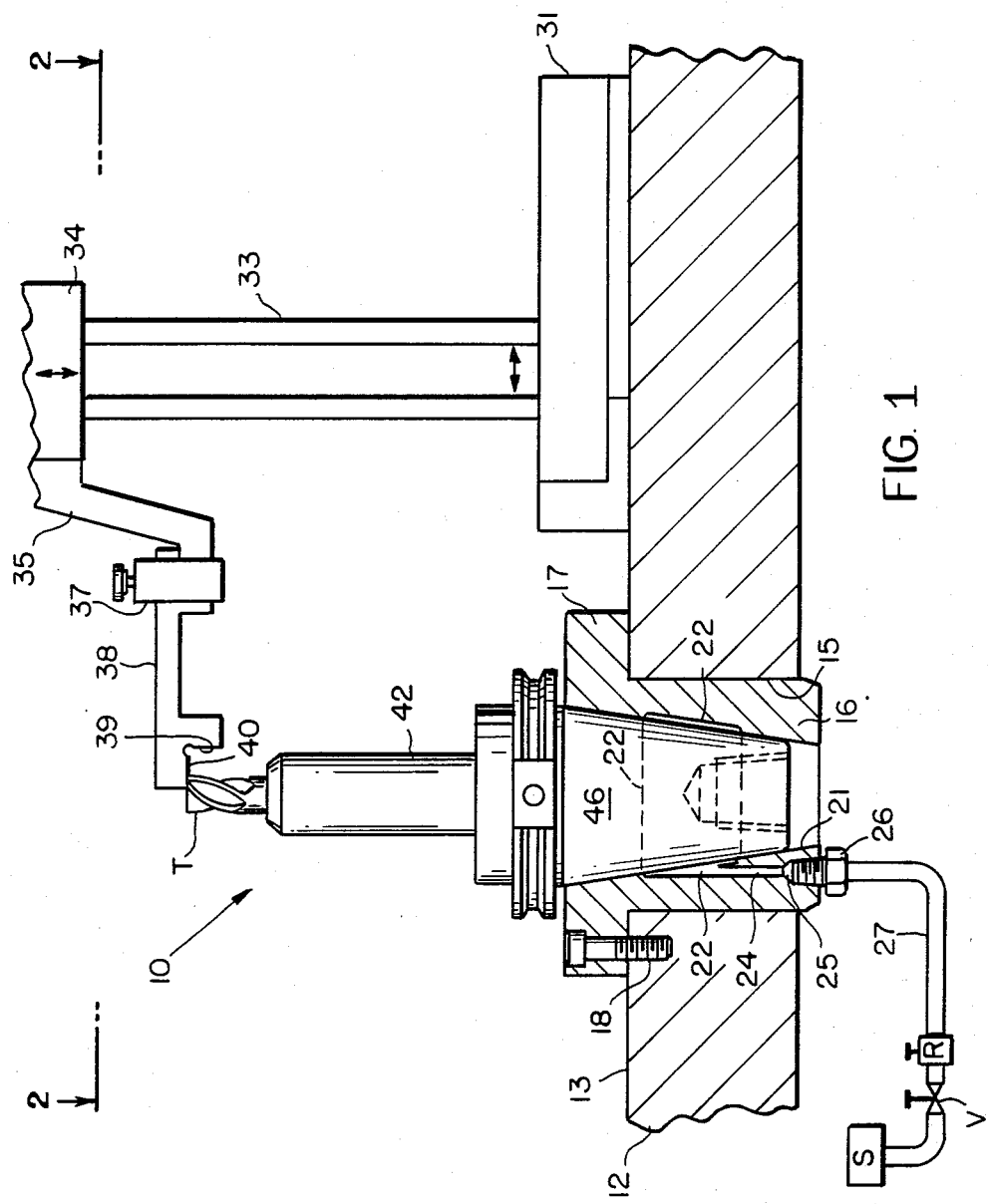
FIG. 1 is a fragmentary side elevational view of a presetting device or instrument made according to one embodiment of this invention, portions of the instrument and its associated spindle support being cut away and shown in section.
Figure 2:
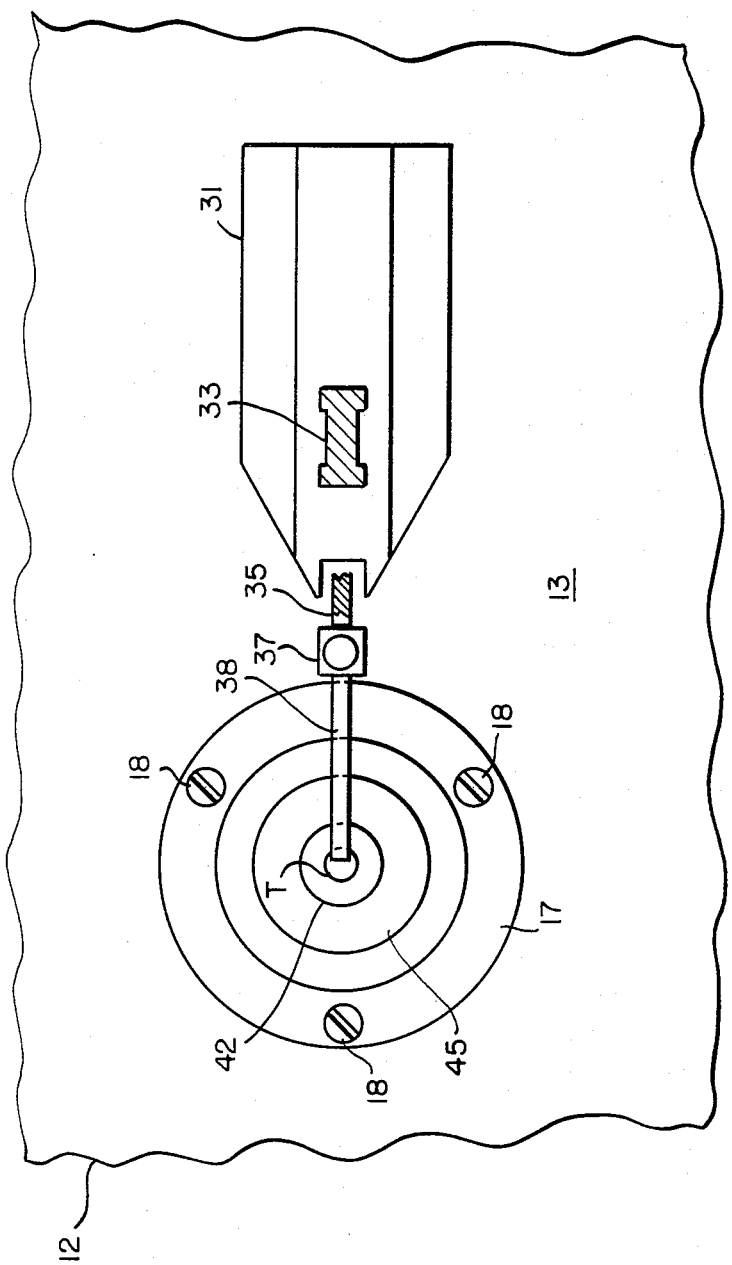
FIG. 2 is a fragmentary plan view of this device.

Referring now to FIGS. 1 and 2, 10 denotes generally a tool presetting device or instrument comprising a rigid table top or base plate 12, having a plane upper surface 13, that is adapted to be supported in a horizontal plane when the instrument is in use. Secured in a circular recess 15 in the base plate to open at its upper end on surface 13 is a cylindrical spindle support 16. Support 16 is surrounded at its upper end by a laterally projecting, circumferential flange 17, which overlies the upper surface 13 of plate 12, and which is releasably secured thereagainst by a plurality of bolts 18. Support 16 has therethrough an axial bore 21, which is of inverted, frusto-conical configuration. Intermediate its ends the bore wall 21 has therein a shallow, circumferential recess 22 the upper and lower edges of which are axially spaced inwardly from the upper and lower ends, respectively, of bore 21. Adjacent its lower end support 16 has therein an axially extending duct 24, which opens on its upper end on the recess 22, and at its lower end on an internally threaded port 25 that is formed in the bottom of support 16. A conventional compressed air fitting 26, which is threaded into the port 25, connects the port through a tube 27, a conventional pressure regulator R, and a conventional ON-OFF valve V with a supply S of air under pressure.

Slidably mounted at its lower end in a block 31, which is fixed to the upper surface 13 of the plate 12, is a gauge supporting pillar or post 33. The lower end of post 33 is slidable in a slot in the block 31 radially toward and away, respectively, from the spindle support 16. Adjustably mounted in a conventional manner on the post 33 is a conventional tool gauge 34 from one side of which projects a feeler supporting arm 35. Adjustably attached at its inner end by clamp 37 to the lower end of arm 35 is a conventional gauge feeler 38 having intermediate its ends a downwardly projecting, tool engaging surface 39, which can be used for measuring the radius or runout of a tool. On its outer end the feeler 38 has on the underside thereof another gauging surface 40, which is used for measuring the height of a tool as denoted hereinafter.

In use a tool T, which in the drawing is shown to be a drill, is chucked or otherwise secured in the upper end 42 of a conventional tool holder 45, which may be of the type that is used for numerically controlled machine tools. The tool holder 45 has on its lower end a downwardly extending, inverted, frusto-conically shaped shank 46, the outer peripheral surface of which is substantially identical in configuration to the bore 21 in the spindle support 16.

In use, the shank 46 of holder 45 is inserted into the upper end of the bore 21, so that the lower end of the shank extends downwardly beyond the lower edge of the recess 22 in holder 16. The outer peripheral surface of the shank 46 therefore confronts upon, and completely seals the recess 22 in the support. In practice, the bore 21 is carefully machined so that it conforms within, by way of example, ±0.00005 in. Obviously, of course, the bore 15 in the plate 12 is likewise very carefully machined so that, when the spindle support 16 is mounted therein the axis of the bore 21 will extend normal to surface 13 of plate 12. The post 33 and the gauge 34 on the testing or measuring device are then adjusted, for example, so that the measuring surface 40 on the underside of the feeler 38 is positioned in engagement with the upper end of the tool T adjacent one radial side thereof. The valve V is then opened and the regulator R is adjusted to supply compressed air to the recess 22, and in a quantity sufficient to cause the shank 46 of the tool holder 45 barely to be elevated relative to the stationary spindle support 16, thereby relieving the pressure exerted by the shank 46 on the bore wall 21 of the support.

In practice the air pressure in recess 22 is controlled, preferably, so that a substantial portion of the overall weight of the tool and its holder is borne by the air in the recess, thus leaving only a small portion of the weight of the tool and holder available to exert frictional force against the bore wall 21. The operator can then easily rotate the tool holder 45 manually relative to the stationary spindle support 16. Since the surfaces 46 and 21 remain in contact with each other during rotation of the holder 45, substantially no axial runout foreign to the tool and its holder 45 is imparted to the tool. This assures a very accurate measurement of the tool height relative to the table top surface 13.

Similarly, if it is desired to measure the radial runout of the tool T, the feeler 38 is adjusted in a known manner to bring into engagement with the side of the tool T the measuring surface 39, which, upon subsequent rotation of the holder 45, will provide a reading of the radial runout of the tool T. Again, any runout foreign to the tool T itself, or its holder 45, is substantially eliminated by virtue of the continuous engagement of the holder shank 46 with the bore wall 21 of the support 16, during rotation of the holder.

Obviously the air pressure in the recess 22 can be regulated by the regulator R; and the supply of air to the recess can be controlled simply by manipulating the valve V.

One of the advantages of this type of instrument is that it provides relatively simple means to measure the multiple edges on face milling cutters, boring tools, and other such tools, which require the measurement or gauging of a plurality of different cutting surfaces. Simply by mounting the tool in the holder 45, and then placing the shank 46 of the holder in the frusto-conical bore 21, one then need only manipulate the valve V in order to relieve the frictional pressure which would otherwise normally be imparted to the confronting surfaces 21, 46 as a result of the force of gravity. As the air pressure builds up in the recess 22, this frictional resistance is lowered to a point where it is a relatively simple matter to rotate holder 45 manually, whenever desired.

While this invention has been illustrated and described in FIGS. 1 and 2 in connection with a conventional presetting device, it will be apparent that it is capable of use in still other instruments or devices in which a holder has a tapered shank of the type denoted at 46, and which is configured sealingly to seat in a complimentary bore 21 containing a surrounding recess which is connected to a compressed air supply.

Figure 3:
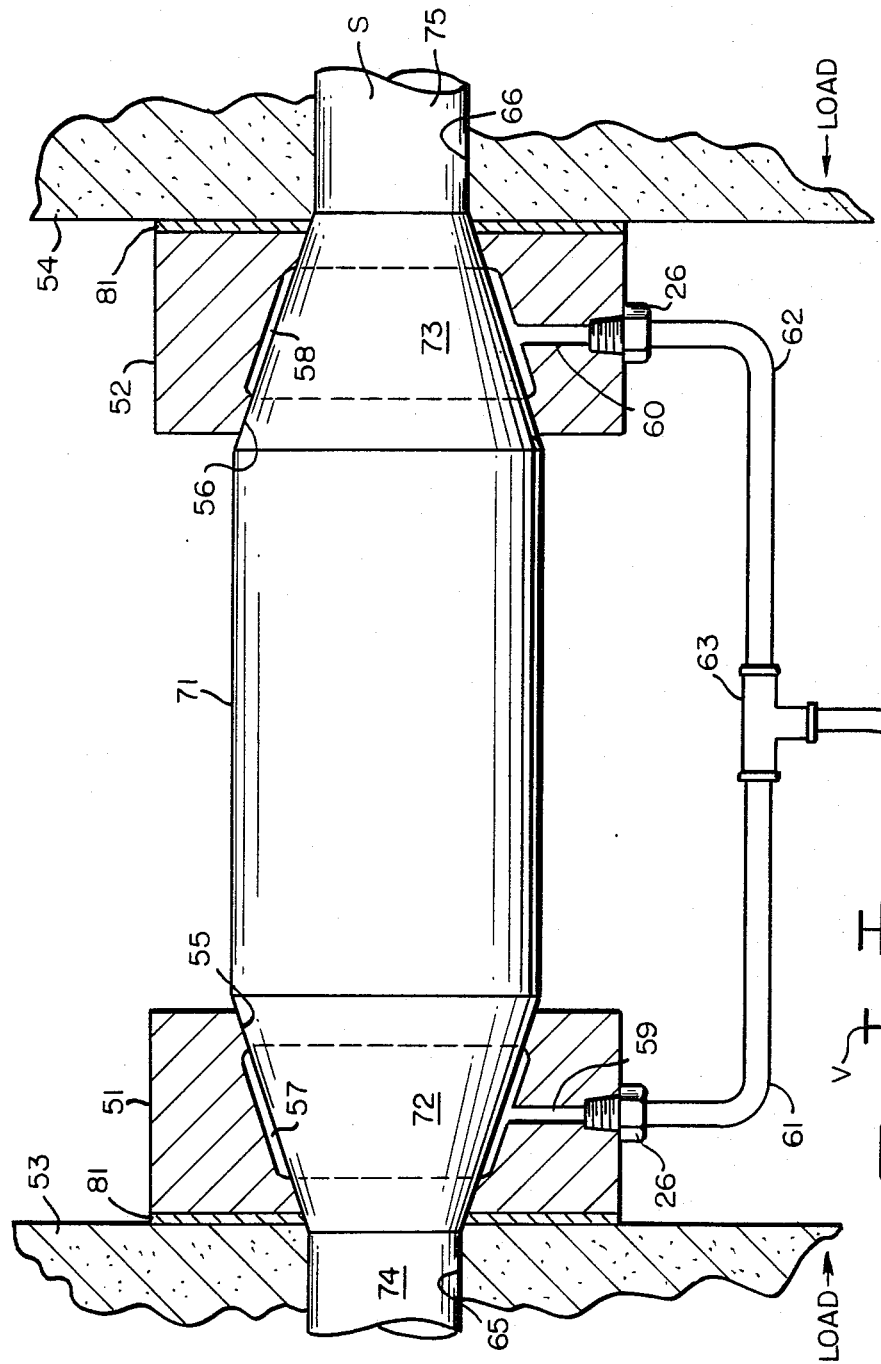
FIG. 3 is a side elevational view showing partially in section, and partially schematically, one manner in which a pair of spindle supports of the type disclosed herein can be utilized to support a drive shaft, or the like, for rotation about a stationary axis.

For example, as shown in FIG. 3, wherein like numerals and letters are employed to denote elements similar to those shown in the first embodiment, two, similarly shaped, tapered air spindle supports 51 and 52 are mounted in coaxially spaced relation to each other on the plane, confronting surfaces of a pair of opposed stationary supports or walls 53 and 54, respectively. Each of the supports 51 and 52 has therethrough a frusto-conically shaped bore 55 and 56, respectively, each of which has therein intermediate its ends a shallow, circumferential recess 57 and 58, respectively. The recesses 57 and 58, which are similar in configuration and function to the recess 22 in the first embodiment, are connected by ports 59 and 60, respectively, and fittings 26, with tubes 61 and 62, respectively. These tubes are connected through a conventional "T" fitting 63, a conventional regulator R and an ON-OFF valve V with a compressed air supply S similar to that described in the first embodiment.

The tapered bores 55 and 56 in the supports 51 and 52 also register coaxially with openings 65 and 66, respectively, which are formed through the walls 53 and 54 for the purpose of accommodating a shaft S. Shaft S has intermediate its ends an enlarged-diameter, load bearing section 71, which extends between the confronting surfaces of the supports 51 and 52, and opposite ends of which have formed thereon frusto-conically shaped bearing surfaces 72 and 73, which are complimentary to, and seated coaxially in, the tapered bores 55 and 56, respectively, of supports 51 and 52. Remote from the enlarged diameter section 71, the ends of the tapered sections 72 and 73 of the shaft are integral with reduced-diameter shaft sections 74 and 75, which extend rotatably through the opening 65 and 66, respectively, in the walls 53 and 54.

Each of the supports 52 and 53 is mounted for limited axial movement by virtue of, for example, layers 81 of resilient material, which are interposed between the supports 51 and 52 and their associated-walls 53 and 54, respectively.

In use, it is possible, if desired, to place a load on the enlarged-diameter section 71 of the shaft S to be rotated between the supports 51 and 52 whenever power is supplied to one end or the other of the shaft in order to rotate it about its axis. In addition, or alternatively, a load may be mounted on one or the other of the end sections 74 and 75 of the shaft S, thereby to apply an axial load to the shaft S while it is being rotated by any conventional means. In any case, during the rotation of the shaft air under pressure is supplied through the valve V, and the regulator, and the tubes 61 and 62 to the recesses 57 and 58 in the supports 51 and 52, thereby providing a fluid, substantially friction-free support for the bearing surfaces 72 and 73 on the shaft. When the fluid pressure builds up in the recesses 57 and 58, the associated support members 51 and 52 are free to shift slightly axially relative to the shaft S, thereby to permit the reduction in the frictional forces otherwise encountered between the bearing surfaces 72 and 73, and the surrounding bore walls 55 and 56.

While it has been suggested in connection with the embodiment shown in FIG. 3 that compressed air be employed, it is possible as an alternative to use a hydraulic fluid under pressure, in which case if any fluid were to leak from the spindle supports 51 and 52 it could be collected and returned to a sump. Hydraulic fluid, of course, would be particularly suitable in the case of extremely heavy loads.

While this invention has been illustrated and described in connection with only certain embodiments thereof, it will be apparent that it is capable of still further modification, and that this application is intended to cover any such modifications as may fall within the scope of one skilled in the art or the appended claims.

What is claimed is:

1. A tool presetting device, comprising
    a support having an inverted, frusto-conically shaped opening in an upper surface thereof,
    a tool holder disposed to have a tool releasably secured in one end thereof, and having on its opposite end an inverted frusto-conically shaped bearing surface similar in configuration to the wall defining said opening in said support, and disposed to be seated releasably in said opening coaxially thereof, thereby to support said one end thereof and any tool therein vertically above said support,
    a gauge adjustably mounted adjacent said support and carrying a feeler element disposed to engage said tool in said holder during a presetting operation,
    said wall having intermediate its ends a circumferential recess disposed to surround and to be sealed by said bearing surface on said holder, when the holder is releasably seated in said opening, and
    means for supplying fluid under pressure to said recess, when said holder is seated in said opening, thereby to enable said holder to be urged slightly upwardly in said opening against the force of gravity, thereby enabling said holder readily to be rotated manually relative to said support.

2. A tool presetting device as defined in claim 1, wherein said fluid supplying means includes means for selectively adjusting the value of the fluid pressure in said recess, when the latter is sealed by said bearing surface on said holder, thereby to urge said holder slightly upwardly without breaking the seal between said recess and said bearing surface.

3. A tool presetting device as defined in claim 1, wherein said holder is held releasably in said opening solely by virtue of the force of gravity.

4. A tool presetting device as defined in claim 1, wherein said means comprises
    a supply of air under pressure, and
    duct means connected at one end to said recess in said wall and at its opposite end to said supply,
    said duct means including means for adjusting the value of the air pressure supplied to said recess.

5. A tool presetting device as defined in claim 1, including
    a base plate having thereon a plane, upper surface, and
    means releasably securing said support in an opening in said upper surface of said plate, and with the axis of said frusto-conically shaped opening in said support extending normal to said plane surface.

6. A tool presetting device as defined in claim 5, wherein
    said gauge is mounted on said base plate for adjustment radially of said axis, and
    said feeler is mounted on said gauge for adjustment longitudinally of said axis.

* * * * *